(12) United States Patent
Bulan et al.

(10) Patent No.: US 11,654,918 B2
(45) Date of Patent: May 23, 2023

(54) ESTIMATION OF ROAD CENTERLINE BASED ON VEHICLE TELEMETRY

(71) Applicant: GM Global Technology Operations LLC, Detroit, MI (US)

(72) Inventors: Orhan Bulan, Novi, MI (US); Sheetal Mahesh, Pflugerville, TX (US); Yehenew G. Mengistu, Sterling Heights, MI (US); Mason D. Gemar, Austin, TX (US); David H. Clifford, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 747 days.

(21) Appl. No.: 16/533,274

(22) Filed: Aug. 6, 2019

(65) Prior Publication Data

US 2021/0041880 A1 Feb. 11, 2021

(51) Int. Cl.
*B60W 40/06* (2012.01)
*G05D 1/02* (2020.01)
(Continued)

(52) U.S. Cl.
CPC .......... *B60W 40/06* (2013.01); *B60W 40/072* (2013.01); *G05B 13/0265* (2013.01); *G05D 1/0088* (2013.01); *G05D 1/0221* (2013.01); *G06N 5/048* (2013.01); *G06N 20/10* (2019.01); *G06V 20/588* (2022.01); *B60W 2552/30* (2020.02); *G05D 2201/0213* (2013.01)

(58) Field of Classification Search
CPC ............... G05D 1/0221; G05D 1/0088; G05D 2201/0213; B60W 40/072; B60W 2552/30; B60W 60/001; B60W 2552/50; B60W 40/06; G05B 13/0265; G06N 5/048; G06N 20/10; G06N 7/005; G06V 20/588; G06K 9/6226
USPC ..... 701/27, 33.4, 451; 340/935, 988, 995.25
See application file for complete search history.

(56) References Cited

U.S. PATENT DOCUMENTS

| 6,674,434 | B1 * | 1/2004 | Chojnacki | G01C 21/32 |
| | | | | 345/428 |
| 2012/0095682 | A1 * | 4/2012 | Wilson | G01C 21/32 |
| | | | | 701/532 |

(Continued)

OTHER PUBLICATIONS

Albin et. al. "Low-Cost Treatments for Horizontal Curve Safety 2016", pp. 1-108, FHWA Report: FHWA-SA-15-084, 2016, https://safety.fhwa.dot.gov/roadway_dept/horicurves/fhwasa1.

(Continued)

*Primary Examiner* — Elaine Gort
*Assistant Examiner* — Ellis B. Ramirez
(74) *Attorney, Agent, or Firm* — Cantor Colburn LLP

(57) ABSTRACT

System and methods for estimating a centerline of a road that separates traffic moving in opposite directions include aggregating a data set from each of a plurality of vehicles traversing the road over a period of time as telemetry data. Each data set of the telemetry data indicates a location and a heading. The method includes clustering the data sets of the telemetry data based on the heading indicated by each data set, and identifying a separator to separate the data sets indicating a first heading from the data sets indicating a second heading, opposite to the first heading. The centerline is estimated based on applying a spatial smoothing to the separator.

16 Claims, 5 Drawing Sheets

(51) Int. Cl.
*G06N 20/10* (2019.01)
*G06N 5/048* (2023.01)
*G05D 1/00* (2006.01)
*B60W 40/072* (2012.01)
*G05B 13/02* (2006.01)
*G06V 20/56* (2022.01)

(56) References Cited

U.S. PATENT DOCUMENTS

| | | | |
|---|---|---|---|
| 2014/0278055 A1* | 9/2014 | Wang | G01C 21/3841 |
| | | | 701/409 |
| 2016/0102986 A1* | 4/2016 | Ma | G01C 21/32 |
| | | | 702/5 |
| 2018/0357890 A1* | 12/2018 | Fowe | G08G 1/0133 |
| 2019/0025837 A1* | 1/2019 | Conor | G05D 1/0214 |
| 2020/0355506 A1* | 11/2020 | Muto | G06T 7/74 |
| 2020/0398855 A1* | 12/2020 | Thompson | G01C 21/30 |

OTHER PUBLICATIONS

Oneyear, "Development of Rural Curve Driving Models Using Lateral Placement and Prediction of Lane Departures Using the SHRP 2 Naturalistic Driving Data", pp. 1-143, Iowa Stat.

Carlson et al. "The Benefits of Pavement Markings: A Renewed Perspective Based on Recent and Ongoing Research", pp. 1-21, FHWA Paper No. 09-0488, 2008. https://safety.fhwa.dot.gov/roadway_dept/night_visib/pavement_visib/no090488/.

Leuer, "Fatal Head-On Crashes on Rural Two-Lane Two-Way Highways in Minnesota", pp. 1-28, Minnesota DOT, 2015. https://www.dot.state.mn.us/trafficeng/safety/docs/fatalheadonstudy.pdf.

* cited by examiner

ESTIMATION OF ROAD CENTERLINE BASED ON VEHICLE TELEMETRY

The subject disclosure relates to the estimation of a road centerline based on vehicle telemetry.

Semi-autonomous and autonomous vehicles (e.g., automobiles, trucks, farm equipment, construction equipment) use high-definition or medium-definition maps to navigate. The maps may be generated in a number of ways. For example, a vehicle equipped with sensors (e.g., camera, radar system, lidar system) may be driven over a roadway so that data may be recorded and road features (e.g., lane width and marking, road curvature) may be extracted from the data for inclusion in the map. As another example, a survey may be conducted using aerial images or lidar images. A roadway that conveys two-way traffic may have a centerline that is faded (e.g., due to high traffic) or occluded (e.g., by tree cover, snow, ice) or may have no centerline at all (e.g., a neighborhood road). In this case, the delineation between the two-way traffic must be determined and included in the map used for autonomous navigation to ensure that the vehicle is controlled to be on the correct side of the road. The previously noted sensor-based and survey-based mapping approaches can be resource-intensive. For example, multiple aerial surveys must be conducted of the same area in order to determine and delineate traffic flow. Accordingly, it is desirable to provide an estimation of a road centerline based on vehicle telemetry.

SUMMARY

In one exemplary embodiment, a method of estimating a centerline of a road that separates traffic moving in opposite directions includes aggregating a data set from each of a plurality of vehicles traversing the road over a period of time as telemetry data. Each data set of the telemetry data indicates a location and a heading. The method also includes clustering the data sets of the telemetry data based on the heading indicated by each data set, and identifying a separator to separate the data sets indicating a first heading from the data sets indicating a second heading, opposite to the first heading. The centerline is estimated based on applying a spatial smoothing to the separator.

In addition to one or more of the features described herein, the method also includes identifying a two-way segment of the road.

In addition to one or more of the features described herein, the aggregating and clustering the data set is from each of the plurality of vehicles traversing the two-way segment of the road.

In addition to one or more of the features described herein, the identifying the two-way segment of the road is based on a navigation map or on the telemetry data.

In addition to one or more of the features described herein, the method also includes identifying two or more two-way segments of the road based on a result of the clustering the data sets of the telemetry data.

In addition to one or more of the features described herein, the method also includes calculating a curvature of each portion of the road.

In addition to one or more of the features described herein, the identifying the separator includes using a logistic regression or a linear support vector machine (SVM) based on the curvature being less than a threshold value.

In addition to one or more of the features described herein, the identifying the separator includes using a non-linear SVM with a Gaussian or polynomial kernel based on the curvature being greater than a threshold value.

In addition to one or more of the features described herein, the method also includes indicating the centerline on a map.

In addition to one or more of the features described herein, autonomous operation of one or more vehicles includes using the map.

In another exemplary embodiment, a system to estimate a centerline of a road that separates traffic moving in opposite directions includes a memory device to store a data set provided by each of a plurality of vehicles traversing the road over a period of time. Each data set of the telemetry data indicates a location and a heading. The system also includes a processor to aggregate the data sets as telemetry data, to cluster the data sets of the telemetry data based on the heading indicated by each data set, to identify a separator to separate the data sets indicating a first heading from the data sets indicating a second heading, opposite to the first heading, and to estimate the centerline based on applying a spatial smoothing to the separator.

In addition to one or more of the features described herein, the processor identifies a two-way segment of the road.

In addition to one or more of the features described herein, the processor aggregates and clusters the data sets from each of the plurality of vehicles traversing the two-way segment of the road.

In addition to one or more of the features described herein, the processor identifies the two-way segment of the road based on a navigation map or on the telemetry data.

In addition to one or more of the features described herein, the processor identifies two or more two-way segments of the road based on a result of clustering the data sets of the telemetry data.

In addition to one or more of the features described herein, the processor calculates a curvature of each portion of the road.

In addition to one or more of the features described herein, the processor identifies the separator by using a logistic regression or a linear support vector machine (SVM) based on the curvature being less than a threshold value.

In addition to one or more of the features described herein, the processor identifies the separator by using a non-linear SVM with a Gaussian or polynomial kernel based on the curvature being greater than a threshold value.

In addition to one or more of the features described herein, the processor indicates the centerline on a map.

In addition to one or more of the features described herein, autonomous operation of one or more vehicles includes using the map.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
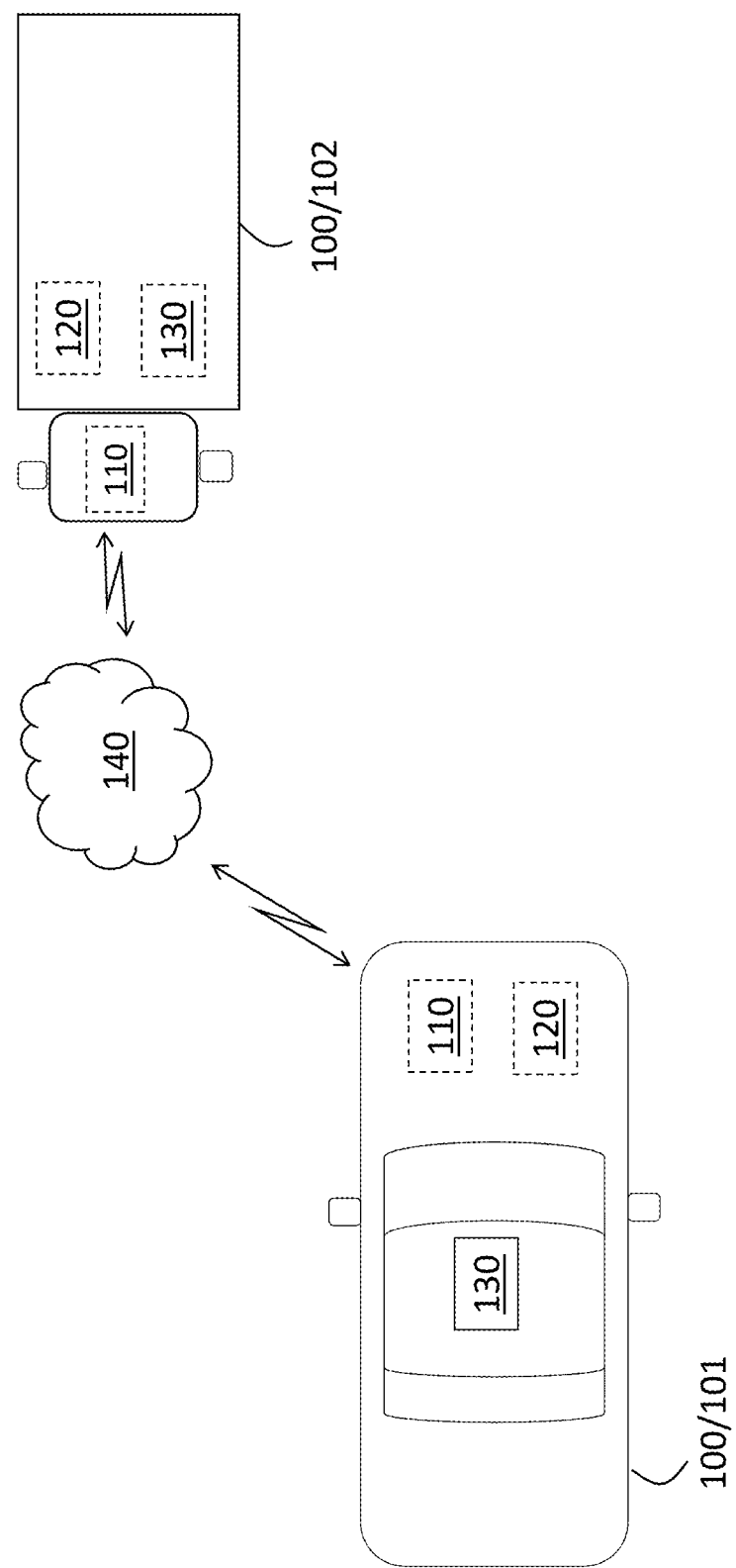
FIG. 1 shows an exemplary system to estimate a road centerline based on vehicle telemetry according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a roadway that accommodates two-way traffic may not have a marked centerline that indicates the border between the traffic moving in each direction or may have a centerline that is faded. As a result, typical mapping approaches such as aerial surveying or sensor-based approaches cannot readily discern the centerline. Embodiments of the systems and methods detailed herein relate to an estimation of a road centerline based on vehicle telemetry. Telemetry data obtained by a number of vehicles is aggregated and clustered in order to find a separator of the clusters as an estimate of the centerline.

In accordance with an exemplary embodiment, FIG. 1 shows an exemplary system to estimate a road centerline based on vehicle telemetry. Two exemplary vehicles 100 are shown in FIG. 1. One is an automobile 101 and the other is a truck 102. The automobile 101 and the truck 102 are shown to include a global positioning system (GPS) 110 and other sensors 130 (e.g., lidar system, radar system, one or more cameras). They also include a processor 120. The processor 120 of each vehicle 100 may obtain information from the GPS 110 and other sensors 130 that is used to augment or automate operation of the vehicle 100. In addition, as shown, the processor 120 may facilitate communication with a controller 140. Each processor 120 and the controller 140 may use processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The controller 140 may perform cloud-based communication, as shown, or may perform cellular or other wireless communication with multiple vehicles 100 over a period of time. The controller 140 may be part of a vehicle 100 itself or may be included in infrastructure at a particular location. The vehicles 100 may provide telemetry data to the controller 140. Telemetry data includes position information for the vehicle 100 based on the GPS 110. Telemetry information also includes information indicating a direction and speed of the vehicle 100 as well as additional information such as elevation, for example. The controller 140 may store the telemetry data (i.e., each data set 405 (FIG. 4)) received from each vehicle 100 for processing. By using telemetry information from a number of vehicles 100 that traverse the same roadway, the controller 140 estimates a centerline 510 (FIG. 5) as detailed with reference to FIGS. 2 and 3.

Figure 2:
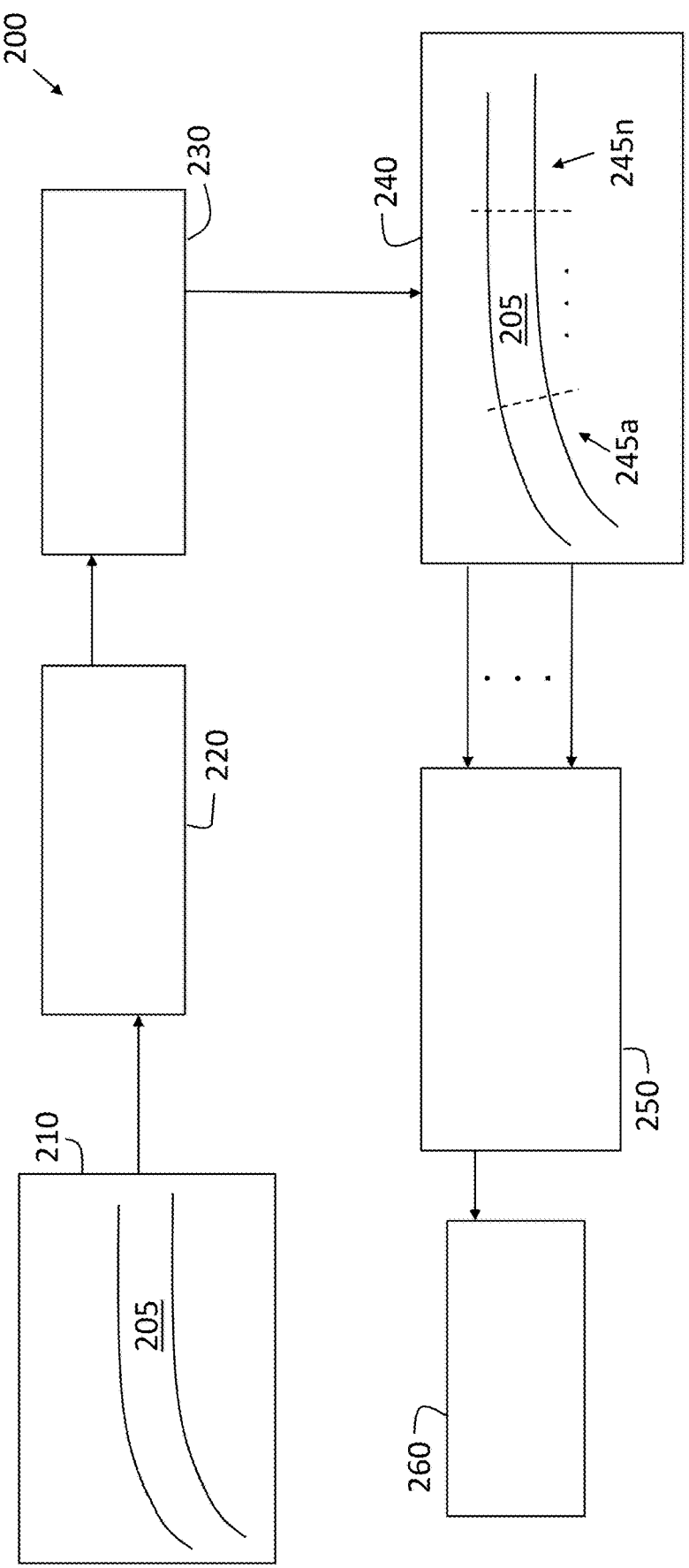
FIG. 2 is a process flow of a method of estimating a road centerline based on vehicle telemetry according to exemplary one or more embodiments.

FIG. 2 is a process flow of a method 200 of estimating a road centerline 510 (FIG. 5) based on vehicle telemetry according to exemplary one or more embodiments. At block 210, the method includes identifying a road 205 of interest. At block 220, aggregating telemetry data for the road 205 includes the controller 140 receiving and storing telemetry data (e.g., GPS position information, direction, speed) from a number of vehicles 100 that traverse the road 205 over a period of time. A given vehicle 100 may provide telemetry data for the road 205 at more than one location on the road 205. That is, telemetry data may be obtained by the vehicle 100 and provided to the controller 140 periodically, for example. If the vehicle 100 is on the road 205 for multiple periods, the vehicle 100 may provide telemetry data collected at each of those periods. In addition, a vehicle 100 travelling the road 205 at different times may provide telemetry data for the road 205 during each of those times.

Clustering the telemetry data based on heading, at block 230, refers to separating telemetry data that indicates a direction of travel on the road 205 from telemetry data that indicates an opposite direction of travel on the road 205. As part of this processing, noisy data may be filtered out. For example, telemetry data indicating a heading perpendicular to the road (e.g., based on a vehicle 100 turning into a driveway or other road) may be eliminated during the clustering. In addition, elevation indicated by the telemetry data may be used to filter out noisy data pertaining to vehicles on an overpass above the road 205 or on an underpass below the road 205. The telemetry data itself (i.e., the heading or elevation indicated), information from a navigation map, or a combination of the two may be used to implement this filtering out of telemetry data that does not pertain to travel along the road 205.

At block 240, separating the road 205 into segments 245a through 245n (generally referred to as 245) includes identifying one-way and two-way portions of the road 205. The centerline 510 (FIG. 5) is only relevant for segments 245 of the road 205 that facilitate traffic in opposite directions of travel. Thus, portions of the road 205 that may be restricted to one-way traffic may be excluded from further processing according to the method 200. If all of the road 205 is two-way, segments 245 may be selected according to shape or length. For example, the road 205 may be separated into segments 245 that are all the same length. Alternately, a straight portion of the road 205 may be designated as a separate segment 245 from an adjacent curved portion of the road 205.

At block 250, identifying a separator 410 (FIG. 4) for the telemetry clusters refers to determining a separator 410 for each two-way segment 245 from block 240. The process of obtaining the separator 410 is further discussed with reference to FIG. 5. For each segment 245, the telemetry data that is clustered according to heading, at block 230, is used to determine the separator 410. Once the separator 410 for each two-way segment 245 is determined, applying spatial smoothing, at block 260, includes putting the segments 245 together to provide a centerline 510 (FIG. 5) for the road 205. The processes of obtaining the separator 410 and then the centerline 510 are further discussed with reference to FIG. 5. The estimate of the centerline 510 may be included in the map used by the autonomous vehicle 100.

Figure 3:
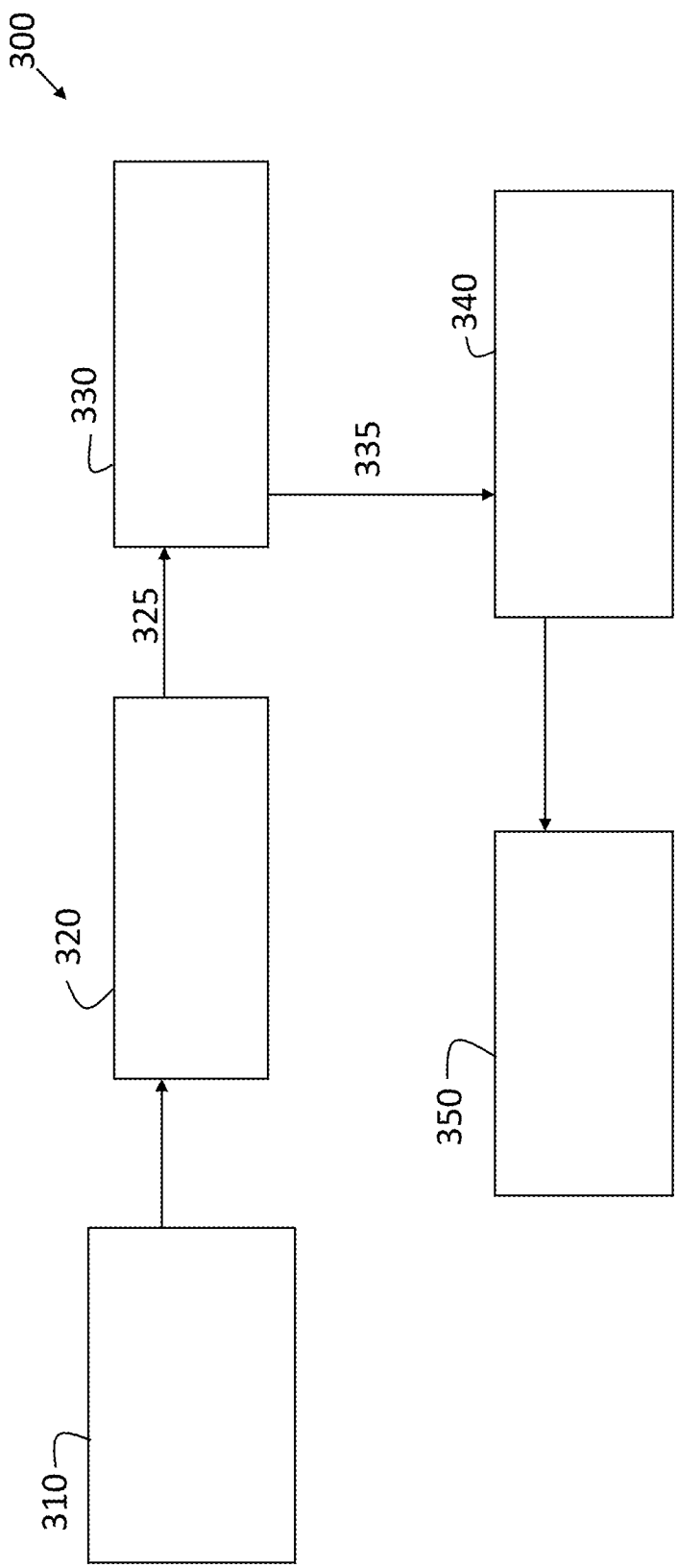
FIG. 3 is a process flow of a method of estimating a road centerline based on vehicle telemetry according to other exemplary one or more embodiments.

FIG. 3 is a process flow of a method 300 of estimating a road centerline 510 (FIG. 5) based on vehicle telemetry according to other exemplary one or more embodiments. According to the embodiment shown in FIG. 3, the method 300 includes obtaining a two-way road segment 245 of interest, at block 310. Thus, separation of a road 205 into segments 245 is done prior to any processing of telemetry data rather than based on clustering of telemetry data (at block 230, FIG. 2) as in the previously discussed exemplary embodiment. The identification of the two-way road segment 245 may use additional information such as a navigation map. Alternately, the telemetry data collected for the road 205 may be used to identify the two-way road segment 245 of interest, at block 310, prior to any clustering.

Figure 4:
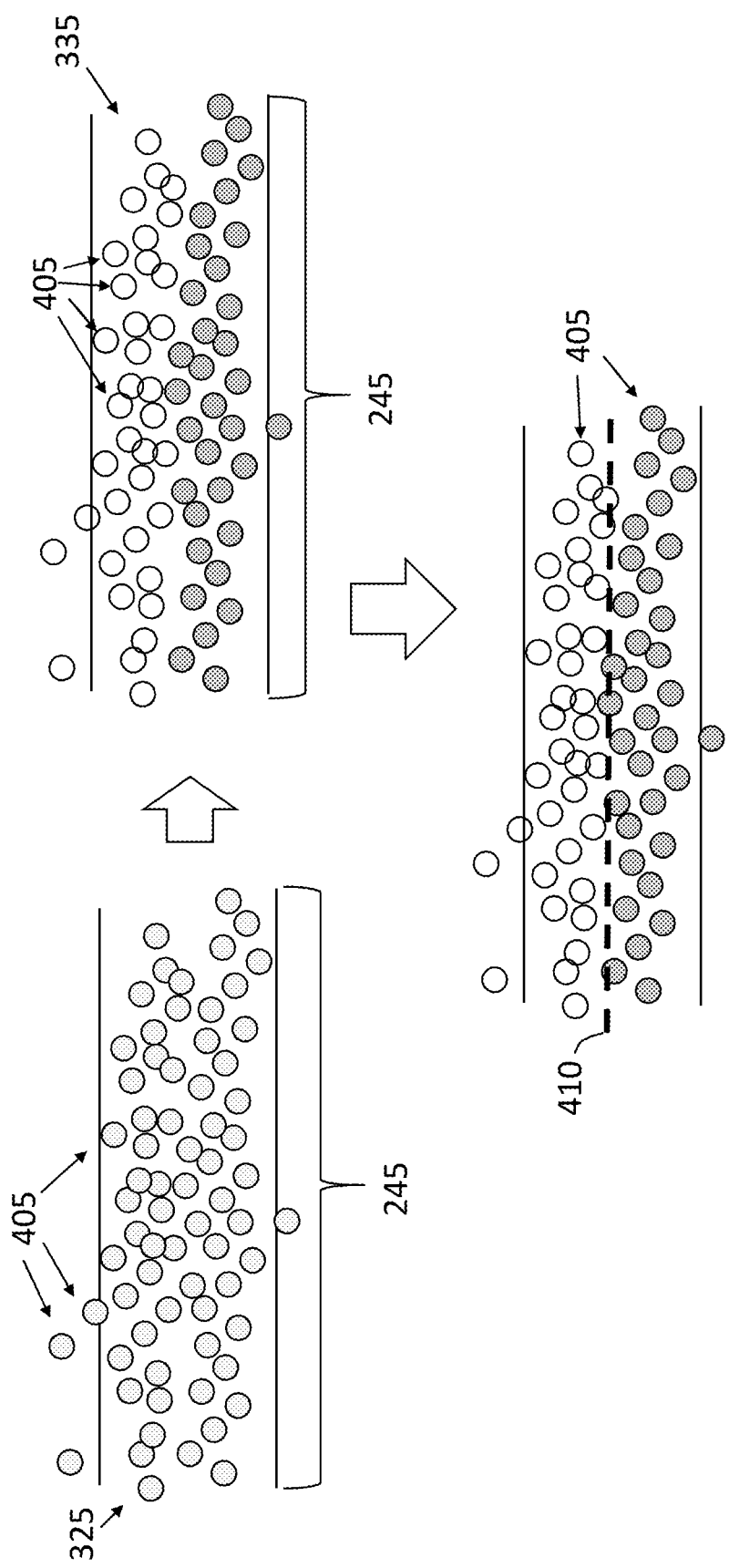
FIG. 4 illustrates aggregating and clustering exemplary telemetry data according to one or more embodiments.

At block 320, aggregating telemetry data for the segment 245 includes limiting the telemetry data that is used to data with a location matching locations of the segment 245. Exemplary aggregated telemetry data 325, output from block 320, is shown in FIG. 4. At block 330, clustering telemetry data based on heading refers to separating telemetry data indicating a direction of travel from telemetry data indicating an opposite direction of travel, as in block 230 (FIG. 2). As discussed with reference to FIG. 2 and, specifically, the processing at block 230, telemetry data may additionally be filtered to leave out data pertaining to a heading that is perpendicular to the segment 245 or travel on a different roadway above or below the segment 245. Unlike the process at block 230, the clustering, at block 330, is limited to telemetry data associated with the segment 245 of interest which is known to be a two-way segment 245. Exemplary clustered telemetry data 335, output from block 330, is shown in FIG. 3.

At block 340, like at block 250 (FIG. 2), identifying a separator 410 (FIG. 4) for the telemetry clusters refers to determining a delineation between clusters associated with one heading and clusters associated with an opposite heading. This is further discussed with reference to FIG. 5. Unlike at block 250, the identification of a separator 410 is for one two-way segment 245 at block 340. Once the separator 410 for the segment 245 selected at block 310 is determined, applying spatial smoothing, at block 350, may include putting the segment 245 together with other segments 245 of a road 205 or simply smoothing the separator 410 for the segment 245 of interest to provide a centerline 510 (FIG. 5).

FIG. 4 illustrates aggregating and clustering exemplary telemetry data according to one or more embodiments. One exemplary two-way road segment 245 is shown with aggregated telemetry data 325. Each data set 405 indicates a location (e.g., GPS position) along the segment 245 and other information such as direction, speed, and elevation, for example. According to the separation based on heading information provided for each data set 405, clustered telemetry data 335 may be obtained for the exemplary segment 245 at block 330 (FIG. 3). The clustered telemetry data 335 may be part of the information obtained for a road 205 at block 230 (FIG. 2). As shown in FIG. 4, the data sets 405 are color coded to distinguish those associated with a heading in one direction from those associated with a heading in the opposite direction. The separator 410 shown in FIG. 4 is a demarcation of the clustered telemetry data 335 according to heading. Thus, most or all of the data sets 405 associated with one heading are separated by the separator 410 from most or all of the data sets 405 associated with an opposite heading. The process of determining the separator 410 is further discussed with reference to FIG. 5.

Figure 5:
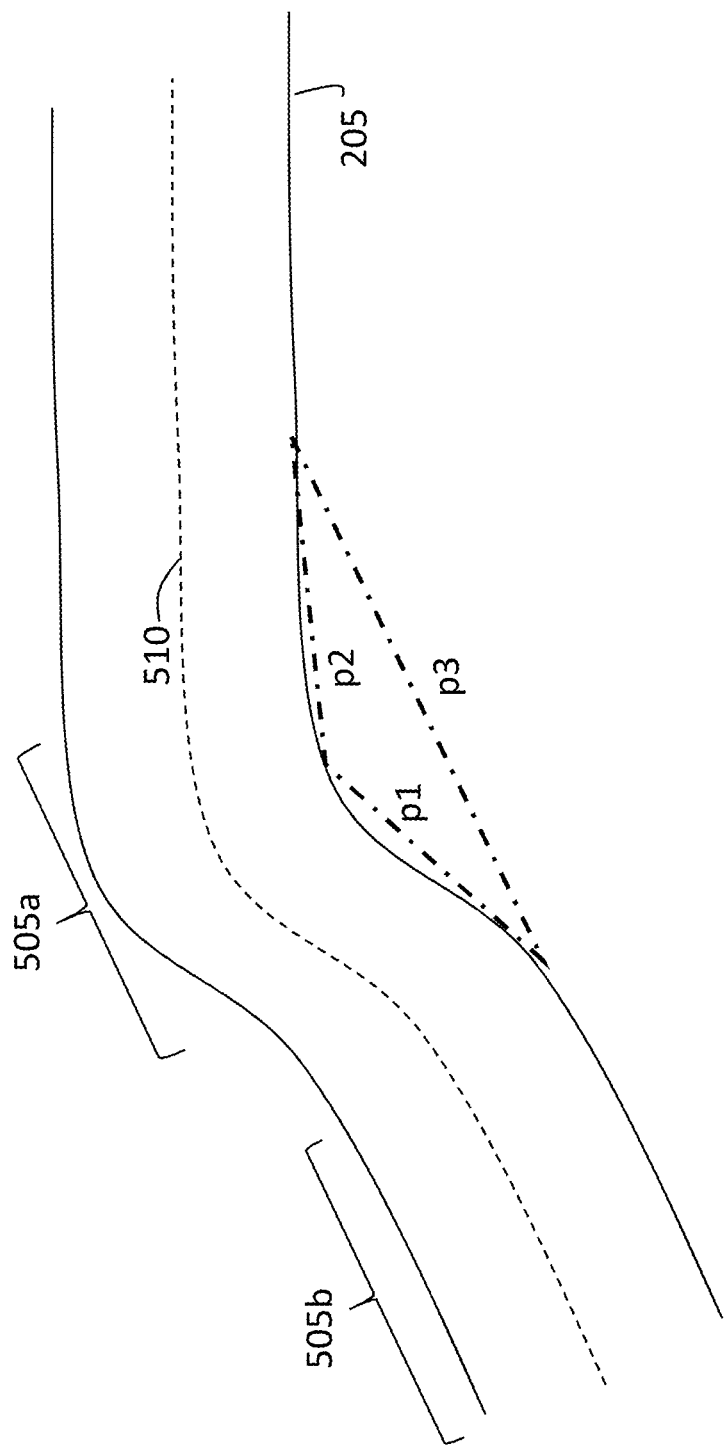
FIG. 5 illustrates an exemplary center line of a road that is estimated based on telemetry data according to one or more embodiments.

FIG. 5 illustrates an exemplary center line 510 of a road 205 that is estimated based on telemetry data according to one or more embodiments. Specifically, the centerline 510 is estimated based on the separator 410. Estimating the separator 410 results from the processing at block 250 (FIG. 2) or block 340 (FIG. 3) according to exemplary embodiments. As previously noted, the separator 410 of a segment 245 of the road 205 may be identified for multiple segments 245, at block 250 (FIG. 2), or for one segment 245 at a time, at block 340 (FIG. 3). While a segment 245 alone may represent the road 205 of interest according to an exemplary embodiment, multiple segments 245 may be put together to estimate the centerline 510 of a road 205 instead. Thus, the process of applying spatial smoothing, at block 260 (FIG. 2) or at block 350 (FIG. 3), to output the estimate of the centerline 510 may include putting together multiple segments 245 and corresponding separators 410. If the method 200 according to the embodiment shown in FIG. 2 is used, then the position and connection of the segments 245 is known since separating the road 205 into segments 245 is part of the processing, at block 240. Alternately, a navigation map may be used to determine how the segments 245 connect with one another to form the road 205.

As FIG. 5 shows, a road 205 may include curved areas 505*a* and straight areas 505*b* (generally referred to as area 505). A given segment 245 may include both curved areas 505*a* and straight areas 505*b*. In the exemplary case shown in FIG. 5, the curved area 505*a* may be a segment 245 and the straight area 505*b* may be a different segment 245 of the road 205. Estimating the centerline 510 from the one or more separators 410 of one or more segments 245 of the road 205 includes applying spatial smoothing to the connected separators 410. Estimating each of the separators 410 includes processing straight areas 505*b* differently from curved areas 505*a*. Thus, calculating curvature to determine which approach to take is part of identifying the separator 410, at block 250 or block 340. A triangle with three sides of lengths p1, p2, and p3 is shown to fit the curved area 505*a* of the exemplary road 205 in FIG. 5. The curvature is given by:

$$\text{curvature} = \frac{4*\text{area}}{(\|p1-p2\|*\|p2-p3\|*\|p1-p3\|)} \quad [\text{EQ. 1}]$$

In EQ. 1, area refers to the area of the triangle with the sides of lengths p1, p2, and p3. If the curvature of a given area 505 exceeds a threshold value, then the area 505 is deemed to be a curved area 505*a*. Below the threshold curvature value, the area 505 is deemed to be a straight area 505*b*. In straight areas 505*b*, a logistic regression or a linear support vector machine (SVM) may be used to separate clustered telemetry data 335 and thereby obtain separator 410. In curved areas 505*a*, a non-linear SVM with a Gaussian or polynomial kernel may be used separate the clusters and obtain the separator 410.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A method of estimating a centerline of a road that separates traffic moving in opposite directions, the method comprising:
 separating the road into a plurality of road segments;
 for each road segment:
  aggregating, at a controller, a data set from each of a plurality of vehicles traversing the road over a period of time as telemetry data, each data set of the telemetry data indicating a location and a heading;

clustering, by the controller, the data sets of the telemetry data based on the heading indicated by each data set;

identifying a separator to separate the data sets indicating a first heading from the data sets indicating a second heading, opposite to the first heading;

connecting the separators of the plurality of road segments;

estimating the centerline based on applying a spatial smoothing to the connected separators;

indicating the centerline on a map; and performing autonomous operation of one or more vehicles using the map.

2. The method according to claim 1, further comprising identifying a two-way segment of the road.

3. The method according to claim 2, wherein the aggregating and clustering the data set is from each of the plurality of vehicles traversing the two-way segment of the road.

4. The method according to claim 2, wherein the identifying the two-way segment of the road is based on a navigation map or on the telemetry data.

5. The method according to claim 1, further comprising identifying two or more two-way segments of the road based on a result of the clustering the data sets of the telemetry data.

6. The method according to claim 1, further comprising calculating a curvature of each portion of the road.

7. The method according to claim 6, wherein the identifying the separator includes using a logistic regression or a linear support vector machine (SVM) based on the curvature being less than a threshold value.

8. The method according to claim 6, wherein the identifying the separator includes using a non-linear SVM with a Gaussian or polynomial kernel based on the curvature being greater than a threshold value.

9. A system to estimate a centerline of a road that separates traffic moving in opposite directions, the system comprising:

a memory device configured to store a data set provided by each of a plurality of vehicles traversing the road over a period of time, each data set of the telemetry data indicating a location and a heading; and a processor configured to:
separate the road into a plurality of road segments;
for each road segment, aggregate the data sets as telemetry data, to cluster the data sets of the telemetry data based on the heading indicated by each data set,
for each road segment, identify a separator to separate the data sets indicating a first heading from the data sets indicating a second heading, opposite to the first heading,
estimate the centerline based on connecting the separators of the plurality of road segments and applying a spatial smoothing to the connected separators, and
indicate the centerline on a map, wherein autonomous operation of one or more vehicles is performed according to the map.

10. The system according to claim 9, wherein the processor is further configured to identify a two-way segment of the road.

11. The system according to claim 10, wherein the processor aggregates and clusters the data sets from each of the plurality of vehicles traversing the two-way segment of the road.

12. The system according to claim 10, wherein the processor is configured to identify the two-way segment of the road based on a navigation map or on the telemetry data.

13. The system according to claim 9, wherein the processor is further configured to identify two or more two-way segments of the road based on a result of clustering the data sets of the telemetry data.

14. The system according to claim 9, wherein the processor is further configured to calculate a curvature of each portion of the road.

15. The system according to claim 14, wherein the processor is configured to identify the separator by using a logistic regression or a linear support vector machine (SVM) based on the curvature being less than a threshold value.

16. The system according to claim 14, wherein the processor is configured to identify the separator by using a non-linear SVM with a Gaussian or polynomial kernel based on the curvature being greater than a threshold value.

* * * * *